US006285456B1

(12) United States Patent
Narumi (10) Patent No.: US 6,285,456 B1
(45) Date of Patent: Sep. 4, 2001

(54) DIMENSION MEASUREMENT USING BOTH COHERENT AND WHITE LIGHT INTERFEROMETERS

(75) Inventor: Tatsuya Narumi, Kawasaki (JP)

(73) Assignee: Mitutoyo Corporation, Kanagawa (JP)

( * ) Notice: Subject to any disclaimer, the term of this patent is extended or adjusted under 35 U.S.C. 154(b) by 0 days.

(21) Appl. No.: 09/438,533

(22) Filed: Nov. 12, 1999

(30) Foreign Application Priority Data

Nov. 17, 1998 (JP) .................................... 10-326314

(51) Int. Cl.$^7$ ...................................................... G01B 9/02
(52) U.S. Cl. ............................................ 356/497; 356/498
(58) Field of Search ................................... 356/479, 497, 356/496, 498, 492, 493, 485, 486, 73

(56) References Cited

U.S. PATENT DOCUMENTS 5,471,303 * 11/1995 Ai et al. ................................ 356/497
5,659,392 * 8/1997 Marcus et al. ....................... 356/497

* cited by examiner

Primary Examiner—Samuel A. Turner
(74) Attorney, Agent, or Firm—Oliff & Berridge, PLC.

(57) ABSTRACT

An interferometer and method for performing preliminary and main measurements quickly and with high precision are provided. Laser light and white light are successively introduced to the same interferometer booth. Laser light is introduced from a laser light source, and the interference fringe with a reference mirror as a reference is detected using a CCD and a personal computer. By setting the interference fringe to a preset value, the position of a work is adjusted. White light from a halogen lamp is then introduced, a corner cube moving mount is moved, interference fringe with a reference mirror as a reference is detected, and preliminary measurement of the work is performed. Next, laser light is introduced, interference fringe with a reference mirror as a reference is detected, and the main measurement of the work is performed. Because the preliminary and main measurements are performed within the same interferometer booth, the number of steps is reduced and high precision preliminary measurement can be performed.

11 Claims, 11 Drawing Sheets

DIMENSION MEASUREMENT USING BOTH COHERENT AND WHITE LIGHT INTERFEROMETERS

BACKGROUND OF THE INVENTION

1. Field of the Invention

The present invention relates to an interferometer and a measurement method employing such an interferometer, and particularly to an interferometer for measuring length of end standards, such as a gauge block or a length bar.

2. Description of the Related Art

Conventional interferometers are employed for high precision measurement of length gauge blocks and length bars used for correcting various types of measurement machines. Such an interferometer operates by first calculating the integer of interference fringe N by preliminary measurement for measuring an end standard at a precision of half wavelength or less, obtaining the interference fringe fraction $\epsilon$ by main measurement using laser interference, and finally determining the dimension L of the end measure from the equation $L=\lambda/2\ (N+\epsilon)$ When measuring an end standard at a precision of half wavelength or less, a so-called coincidence method is used where a plurality of wavelengths are used to perform preliminary measurements for each wavelength and use the value which coincides independent of a particular wavelength. As an interferometer, a Twyman-Green interferometer, for example, is used.

However, even when the coincidence method is employed, a comparator separate from the laser interferometer must be employed nd separate measurement must be made, and this in turn requires or temperature equalizations (removing any temperature non-uniformity within a work [end measure] due to human body heat and environment temperature, etc. by allowing the object to rest work for a few hours after placement, the work being the object to be measured) for both preliminary and main measurements (the main measurement being a measurement using laser interferometer), making the measurement steps complicated and thus causing a problem of efficiency being low.

Moreover, when a high precision measurement is made, temperature compensation is required to take into account elongation of the end measure according to the coefficient of linear expansion. However, if the preliminary measurement and the main measurement using laser interference are made separately, it is possible for the error in the thermometer used for preliminary measurement and the error in the thermometer used for main measurement to differ, increasing the difficulty of accurately determining the integer of interference fringe N.

SUMMARY OF THE INVENTION

The present invention is directed to solving the problems mentioned above and provides an interferometer that can successively perform the preliminary and main measurements within the same interferometer and that can measure work such as end measures quickly and with high precision, and a measurement method employing such an interferometer.

In order to achieve the above objective, the present invention provides an interferometer for measuring dimension of a work using laser light interference, comprising a laser light source, a white light source, a first optical assembly for introducing laser light from said laser light source onto a work and a first reference surface acting as reference for laser light interference, a second optical assembly for introducing white light from said white light source onto the work and a second reference surface acting as reference for white light interference, a work adjustment means for adjusting the slope of the work with respect to said first reference surface, an interference fringe detecting means for detecting laser light interference fringes generated by said first optical assembly and white light interference fringes generated by said second optical assembly, and a control means for controlling said first and second optical assemblies, work adjustment means, and interference fringe detecting means to successively perform positional adjustment of the work using laser light interference, preliminary measurement of the work using white light interference, and main measurement of the work using laser light.

By providing a first optical assembly for performing the position adjustment and main measurement of work and a second optical assembly for performing the preliminary measurement of work within the same interferometer, preliminary and main measurements can be performed under identical environment conditions, temperature differences between the preliminary and main measurements can be prevented, and quick and highly precise measurement of the work can be made.

In the present invention, it may be preferable for that said first optical assembly to include a first beam splitter for splitting the laser beam from said laser light source into laser light incident on said work and laser light incident on said first reference surface, and said second optical assembly includes a second beam splitter for splitting the white light from said white light source into white light incident on said work and white light incident on said second reference surface.

It may also be preferable for said first and second beam splitters to be a single splitter. By using a single beam splitter, the structure can be simplified while the precision of the preliminary measurement can be simultaneously improved because a common light path is employed.

In the present invention, it may also be preferred to have a means for introducing the laser light radiated from said beam splitter to said first reference surface and for introducing the white light radiated from said beam splitter to said second reference surface. By using such means, introduction of laser light or white light to respective reference surfaces when the first and second reference surface differ is ensured and interference can be generated.

In the present invention, it may also be preferable that a first shutter for turning the laser light on and off be provided on the light path between said laser light source and said first beam splitter in said first optical assembly, and a second shutter for turning the white light on and off be provided on the light path between said white light source and said second beam splitter in said second optical assembly, and said control means introduces laser light by controlling said first shutter to open and said second shutter to close during position adjustment and main measurement of said work, and introduces white light by controlling said first shutter to close and said second shutter to open during said preliminary measurement.

The present invention may further comprise a moving means for changing the optical distance from said second beam splitter to said second reference surface and means for detecting the moved distance of said moving means. By changing the optical distance, white light interference can be generated at a position corresponding to both ends of the work, and by detecting the change in distance, the distance between both ends, which is the dimension of the work, can be preliminary measured. The order of interference is calculated from this preliminary measurement.

It may also be preferable that said second reference surface be a plane mirror.

It may also be preferable that said second reference surface be a corner cube shaped reflection plane. By shaping the reference surface into a corner cube, the incident white light can be reflected to the direction of incidence and interference can be generated even when a small change occurs on the surface due to movement.

In the present invention, it may also be preferable that said first and second reference surfaces be common. By sharing the first and second reference surfaces, the structure can be simplified.

The present invention also provides a method of measuring a work employing the interferometer, this method comprising the steps of placing said work within the interferometer, introducing laser light into said interferometer and adjusting the position of said work with respect to a reference surface using interference of laser light, introducing white light into said interferometer and performing a preliminary measurement of said work using white light interference, and introducing laser light into said interferometer and performing main measurement of said work using laser light interference. The position adjustment, preliminary measurement, and main measurement are performed successively within the same interferometer. By performing both preliminary and main measurements within the same interferometer, the number of work set once, allowing the work to be measured quickly and with high precision.

It may be preferable that said step of adjusting the position of the work comprise steps of a coarse adjustment for adjusting positional difference between the pinhole images of said reference surface and said work, and a fine adjustment for adjusting the interference fringe of said work surface generated by said laser light interference to a preset value.

DESCRIPTION OF PREFERRED EMBODIMENTS

Preferred embodiments of the present invention are explained in the following with reference to accompanying diagrams.

Figure 1:
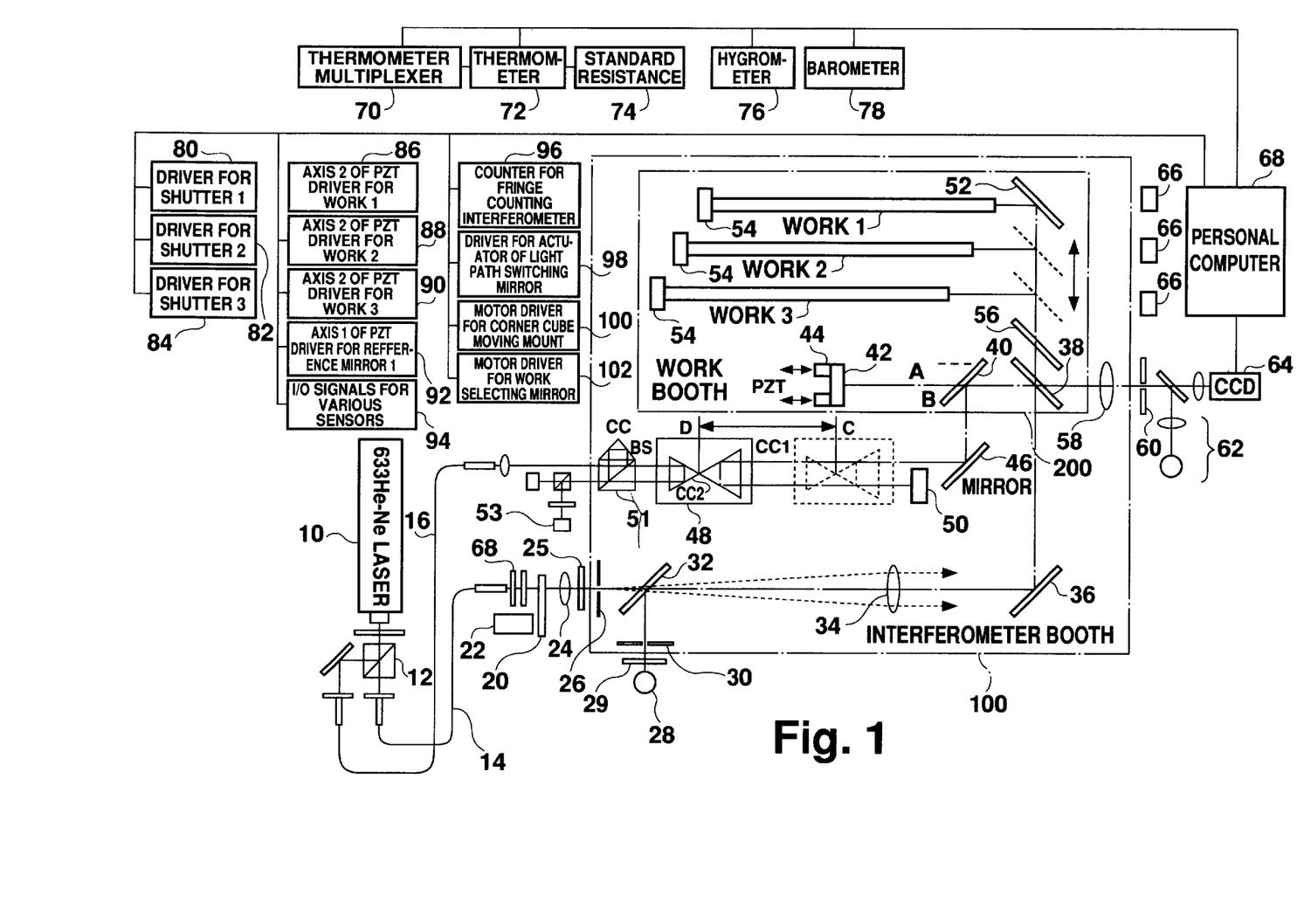
FIG. 1 is a structural block diagram of a first embodiment of the present invention.

FIG. 1 is a structural block diagram showing a first embodiment of the present invention. Measurement in this embodiment is performed by first adjusting the slope of a work (end standard) using laser light, performing a preliminary measurement of work using interference of white light composed of light of a plurality of wavelengths, then and performing the main measurement using interference of laser light. The laser interference section and white light interference section are provided in the same interferometer.

In this example, frequency stabilizing He—Ne laser light source 10 supplies laser light for laser interference. Laser light with a wavelength of 633 nm from the light source 10 is split into laser light for laser interferometer and light for interference fringe counting interferometer at a beam splitter 12. Here, the digital interference fringe counting interferometer is a preliminary measurement of the object of work, and will be described in more detail later. Moreover, it is desirable that the laser light source be detachable to enable easy alignment of optical axis even when the laser light source must be changed due to breakdown or other reason.

The laser light for the laser interferometer from the beam splitter 12 is transmitted to an interferometer section via transmission optical fiber 14. The laser light for digital interference measurement from the beam splitter 12 is transmitted to a digital interference measurement section via transmission optical fiber 16.

Transmission optical fibers 14 and 16 are single mode fibers which store plane of polarization with respect to the wave length band of 543 to 633 nm, and are equipped with a collimator lens on the end surface. The transmission optical fibers 14 and 16 transmit laser light introduced as parallel light, as parallel light. The optical fiber and the collimator lens are connected by an FC type connector. The transmitting side of the transmission optical fiber 14 is equipped with a light isolator 18.

The light isolator 18 comprises two polarization elements (a deflecting plate and a λ/4 waveplate). The linearly polarized laser light transmitted from the transmission optical fiber 14 is changed to a circular polarized light by two polarization elements in the light isolator 18, and the light isolator 18 has a function to reduce the effect of reversed light. A rotational diffusion plate 20 is provided at the end of the light isolator 18.

The rotational diffusion plate 20 rotates a light scattering medium with good transparency, such as ground glass, using a motor 22. The rotational speed is set above a degree which sufficiently averages speckle due to surface roughness of the diffusion plate when an image is obtained at a video rate. The laser light from the rotational diffusion plate 20 is focused by a lens 24, and then introduced to a shutter 25 (also called a proper shutter 1) acting as a first shutter. The shutter 25 is used to decide whether or not to introduce laser light into an interferometer booth 100 and is closed during the preliminary measurement as described later. The opening and closing operation of the shutter 25 is automatically executed by supplying control signals from a personal computer 68 to a driver 80. The laser light penetrating through the shutter is introduced to a pinhole 26 and to a beam splitter 32.

A halogen lamp 28 is provided as a white light source, separately from the laser light source 10. The white light from the halogen lamp 28 is introduced to a shutter 29 (also called a proper shutter (2)) which acts as a second shutter. The shutter 29 is used to decide whether or not white light should be introduce white light into the interferometer booth 100 and is opened to introduce white light during the preliminary measurement. The white light penetrating through the shutter 29 is then introduced to a pinhole 30 and further to the beam splitter 32. The opening and closing operation of the shutter 29 can also be automatically executed by supplying control signals from the personal computer 68 to a driver 82.

The beam splitter 32 is either plate or cube shaped, and lets laser light pass while reflecting white light. The ratio of penetration to reflection is either 1:1 or 2:1.

The laser light from the beam splitter 32 is changed into a parallel light at a collimator lens 34, reflected at a mirror 36, and then introduced to a work booth 200. The white light from the beam splitter 32 is also changed to a parallel light by the collimator lens 34, reflected at the mirror 36 and introduced to the work booth 200.

The work booth 200 has a placing mount on which a plurality of work can be placed. Three works, labeled as work 1, work 2, and work 3 are shown on the figure to be placed on the placing mount. A beam splitter 38 acting as a first beam splitter for splitting into laser light for work and laser light for a reference mirror 42 (explained below), a work selecting mirror 52, and a reference mirror 42 (reference mirror) acting as a first reference surface for being a reference to the laser light interference are also provided. As can be seen from the drawing, the beam splitter 38 also works as a second beam splitter for splitting the white light introduced to the work booth 200 into white light for work and white light for a reference mirror 50. That is, in this embodiment, the first beam splitter and the second beam splitter are constructed as the same beam splitter, and the light paths of laser light and white light from the wave addition beam splitter 32 to the beam splitter 38 are common.

The cross sectional shape of the end standard of the work can be, for example, rectangular shape for a gauge block with size of 9 mm*35 mm, or circular shape for a length bar with a diameter of 22 mm. The cross sectional shape of the platen (base plate) 54 which is to be ringinged to the bottom surface of the work for measurement is circular with a diameter of 45 mm. Platen 54 is employed for obtaining an interference fringe data of the bottom surface side of the work, and can measure the position of the bottom surface of the work by measuring the position of the platen surface. The work placing mount is constructed in a way to allow the slope angle of each of the 3 works with respect to the reference mirror 42 to be adjusted by making them rotatable in both horizontal and vertical directions. The support point of a work can be at the Airy point or Bessel point with respect to the call dimension of the work, or the work can be supported at other arbitrary points. The work can also be placed so that the optical distances from the beam splitter 38 to the central position of the work dimension and the reference mirror 42 are conjugated. For an angle adjustment of the work with respect to the reference mirror 42, a manual leveling 66 for coarse adjustment and a fine adjustment using PZT (not shown) are provided. The fine angle adjustment is automatically executed by outputting control signals from the personal computer 68 to PZT drivers 86, 88, and 90. Of course, instead of manual adjustment, an automatic execution using the personal computer 68 can also be employed for the coarse adjustment. The leveling of the work is explained in more detail below.

A work selecting mirror 52 is included for selecting a work as a measurement object from a plurality of placed works (three works are shown on the figure). The work selecting mirror 52 introduces laser light penetrating through the beam splitter 38 onto one of the works by moving in directions shown by the arrows on the figure. The movement of the work selecting mirror 52 is done by driving a motor driver 102 with a command from the personal computer 68.

The beam splitter 38 introduces a portion of laser light into a work by penetration, and introduces the remaining portion of the laser light onto the reference mirror 42. The beam splitter 38 has a wedge shape with a slope of 5 to 10 minutes to avoid the effect of the interference fringe caused by back reflection. Also, to avoid dispersion effects caused by the wedge angle, a phase compensation plate 56 made of the same material, having the same thickness, and an equal but inverted wedge angle as the beam splitter 38 is provided next to the beam splitter 38.

The reference mirror 42 (reference mirror 1)is a mirror used as a reference surface of the laser interference measurement. The holder for the reference mirror 42 has a function to adjust the slope angle of the reference mirror 42 during an optical axis adjustment when the device is assembled. The reference mirror 42 moves parallel to the direction of the arrow shown on the figure by PZT 44 provided on the back side of the reference mirror 42, to move the interference fringes. The movement range of the reference mirror 42 is 2.5 $\mu$m (corresponds to 8 fringe periods, with the total moved distance equaling to 0.3 $\mu$m after 4 parallel movements, and the fringe moving one period with 0.3 $\mu$m of movement when using 633 nm laser light). The PZT 44 is driven by driving a PZT driver 92 using the personal computer 68.

A light path switching mirror 40 is a mirror for switching between the light paths of laser and white light. By driving an actuator driver 98 using the personal computer 68, the light path switching mirror changes its position between position A and position B shown on the figure. During the preliminary measurement, the light path switching mirror 40 is set at position B to introduce white light from the beam splitter 38 onto a corner cube CC1 through a mirror 46. During the main measurement, the light path switching mirror 40 is set at position A to introduce laser light from the beam splitter 38 onto the reference mirror 42.

The work booth is constructed as explained above. In addition, the interferometer booth 100 is also equipped with a corner cube moving mount 48 for moving the corner cube CC1, a reference mirror 50 (reference mirror 2) acting as the second reference surface for being a reference for white interference light, and a collimator lens 58.

The corner cube moving mount 48 moves the corner cube CC1 for white light interferometer between points C and D shown on the Figure. to change the optical distance from the beam splitter 38 to the second reference surface. At the same time, the corner cube moving mount 48 is also equipped with a digital interference measurement corner cube CC2 for measuring the moved distance of the moving mount. The corner cube moving mount 48 is automatically driven by supplying control signals from the personal computer 68 to the motor driver 100. The movement of the corner cube moving mount 48 is measured using the digital interference measurement laser light from the transmission optical fiber 16. Specifically, the interference light of laser light penetrating through the beam splitter 51 and reflected by the corner cube CC2 on the corner cube moving mount 48 and laser light reflected by a corner cube CC is received by a light receiving element 53 and the moved distance is measured.

The collimator lens 58 collects white light or laser light incident as parallel light and focuses the collected light into a pinhole 60.

The interference booth 100 is constructed as explained above and is characterized by having both light paths of laser and white light within the same interferometer booth 100. The first optical assembly for laser light comprises the optical fiber 14, shutter 25, beam splitter 32, collimator lens 34, mirror 36, beam splitter 38, and work selecting mirror 52. The second optical assembly for white light comprises the second shutter 29, beam splitter 32, collimator lens 34, mirror 36, beam splitter 38, work selecting mirror 52, light path switching mirror 40, mirror 46, and corner cube CC1.

The interference fringe detecting section is next explained. The interference fringe detecting section comprises a pinhole 60, an autocollimator section 62, a CCD 64, and a personal computer 68. The pinhole 60 switches between a diameter of 1.5 mm for white light interference and a diameter of 0.6 mm for laser interference. The autocollimator section 62 includes a light source, a lens, and a reticle, and is used for checking and adjusting the slope angle between the reference surface and the gauge block when an optical axis adjustment becomes necessary. During the auto-leveling, preliminary measurement, and the main measurement of this embodiment, the autocollimator section 62 is not used. The CCD 64 is a camera for observing the interference fringe and pinhole image on the monitor of the personal computer 68, and can easily be replaced with an ocular when necessary.

The interferometer booth 100 has a heat insulating structure to block disturbances out from entire interferometer. In order to prevent deterioration of the heat insulating characteristics, there is only minimum metal portion penetrating through inside and outside of the heat insulating booth. Specifically, the only penetrating metal is focus in sensor cords such as for interference compensation, and the mechanisms for performing fine adjustment from outside in the interference fringe observation condition, such as the work placing mount. These are in turn provided with a low thermal conductivity member reducing the heat flow from each of the adjustment dials into the interferometer.

The work booth 200 is formed from metal so that the temperature distribution of the work is kept uniform. The reference mirror 42 is also placed in the work booth 200 to remove generation of a difference between the optical distance from the beam splitter 38 to the reference mirror 42 and the optical distance from the beam splitter 38 to the work measurement surface. The metal employed is a high thermal conductivity metal such as copper or aluminum.

A thermometer 72, a hygrometer 76, and a barometer 78 are sensors for measuring the ambient environment. The thermometer comprises a thermometer multiplexer 70, a thermometer 72, and a standard resistance 74, and measures the temperature of the work and inside the interferometer, and supplies it to the personal computer 68. The hygrometer 76 measures humidity inside the interferometer and supplies it to the personal computer 68. The barometer 78 measures the air pressure inside the interferometer and supplies it to the personal computer 68.

Figure 2:
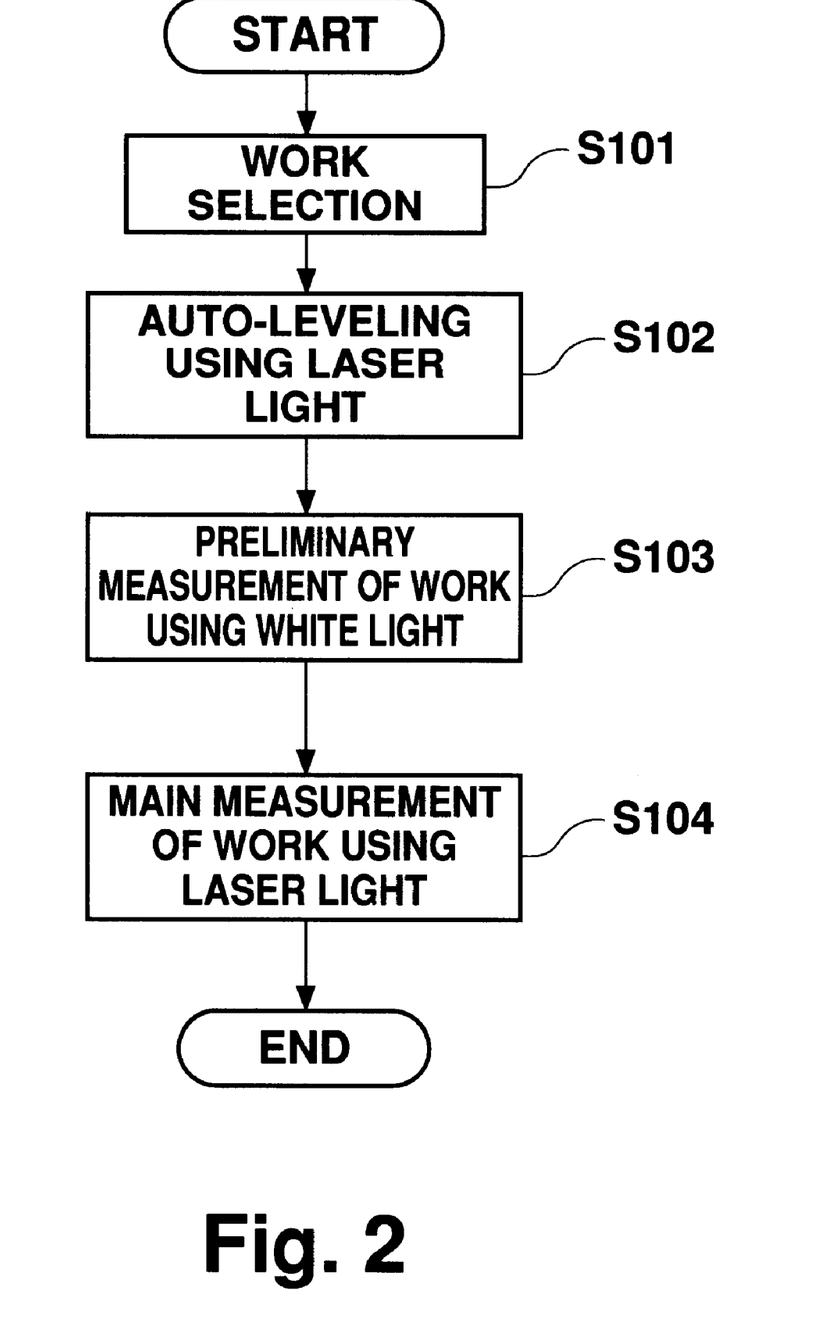
FIG. 2 is an overall process flowchart of the first embodiment.

An overall flowchart of the work (end standard) measurement process of the present embodiment is shown on FIG. 2. First, a work (end standard) to be measured is selected (S101). Specifically, this selection is performed by moving the work selecting mirror 52 to a desired work position by a command from the personal computer 68. Then, the shutter 25 is opened and the shutter 29 is closed to introduce laser light into the work booth 200. At the same time, the light path switching mirror 40 is set at position A and auto-leveling of the work using laser interference light is performed (S102). Auto-leveling makes the work surface almost parallel to the mirror surface of the reference mirror 42. As described before, this comprises coarse adjustment and fine adjustment steps. After the auto-leveling of the work is completed, the shutter 25 is closed and the shutter 29 is opened to introduce white light from the halogen lamp 28 into the interference booth 100. At the same time, the light path switching mirror 40 is set at position B and the preliminary measurement of work using the white interference light is performed (S103). The dimension of work is measured during this preliminary measurement. Then, the shutter 25 is again opened and the shutter 29 is closed to introduce laser light onto the work booth 200, and at the same time, the light path switching mirror 40 is set at position A and the main measurement of the work is performed (S104). In the main measurement of the work, the interference fringe fraction $\epsilon$ is calculated, and using the order of interference N together with this interference fringe fraction $\epsilon$, the dimension L of the work is calculated with high precision. Each process shown on FIG. 2 is automatically performed by the personal computer 68 executing install programs.

Figure 3:
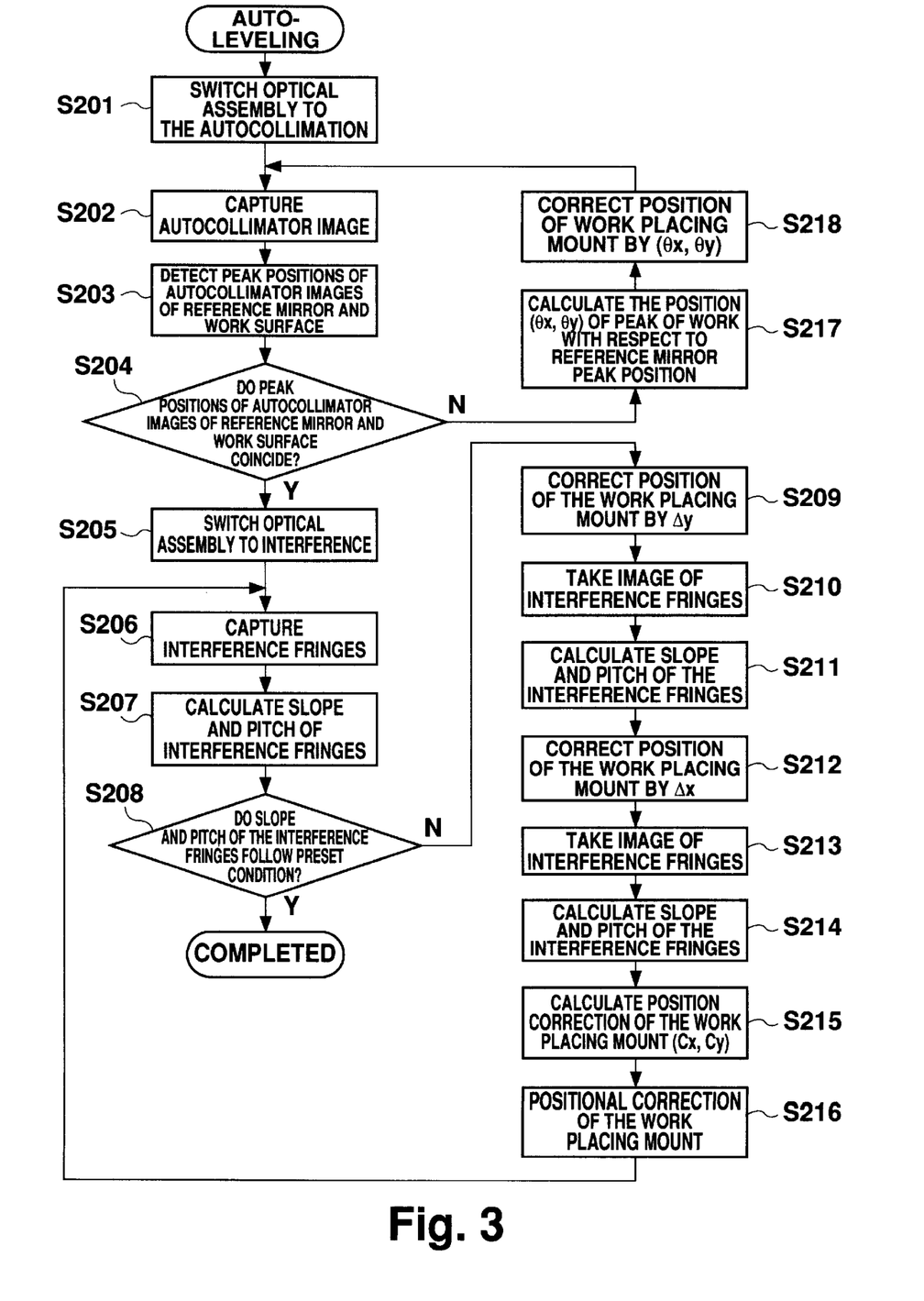
FIG. 3 is a detailed flowchart showing the auto-leveling process show in FIG. 2.

FIG. 3 shows a detailed flowchart of the auto-leveling process of the work shown as S102 on FIG. 2. First, the shutter 25 is opened and the shutter 29 is closed. The light path selecting mirror 40 is set at position A and the optical assembly is switched to auto-leveling coarse adjustment (for purpose of explanation, this is referred to as "for autocollimator" and the fine adjustment is referred to as "autocollimation" from hereon. However, it should be note, that these are not the same as the autocollimator section 62 shown on FIG. 1 and the optical axis adjustment of the reference mirror 42 performed at this autocollimator section 62) (S201).

Figure 4A:
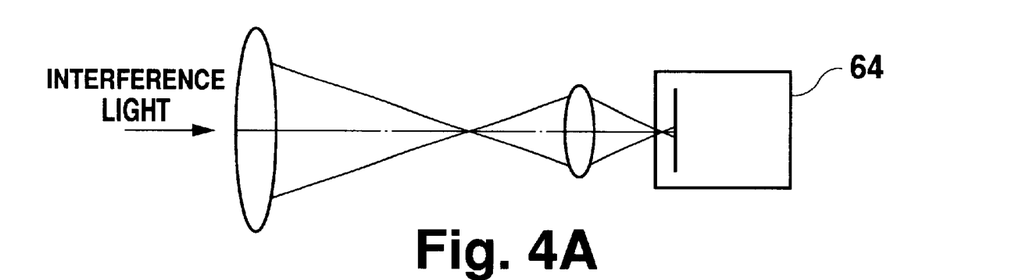
FIG. 4A is a figure explaining the optical assembly (for coarse adjustment) used for the process shown in FIG. 3.
Figure 4B:
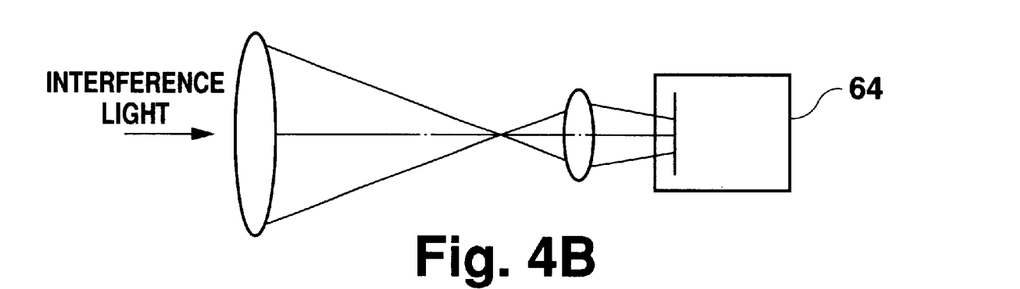
FIG. 4B is a figure explaining the optical assembly (for fine adjustment) used for the process shown in FIG. 3.

FIG. 4A and 4B respectively show the optical assemblies for coarse and fine adjustment of auto-leveling. In the fine adjustment optical assembly, the image is focused to a wide focus range of CCD 64 of the camera, and in the coarse adjustment optical assembly, the image is focused to a narrow focus range of CCD 64.

Figure 5:
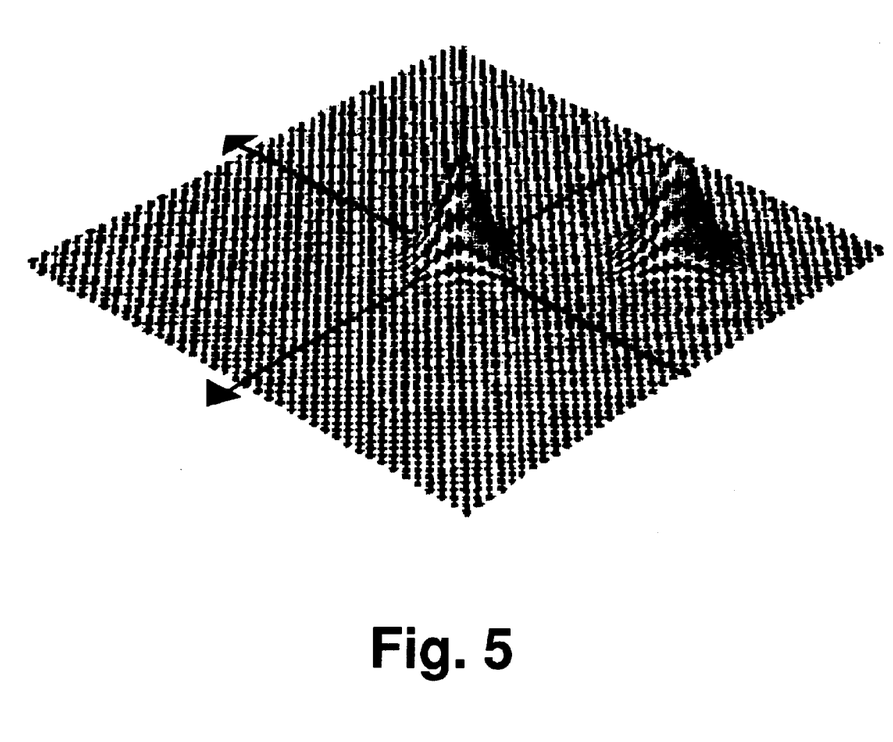
FIG. 5 is a figure explaining the pinhole image of reference mirror and t work surface with slope.
Figure 6:
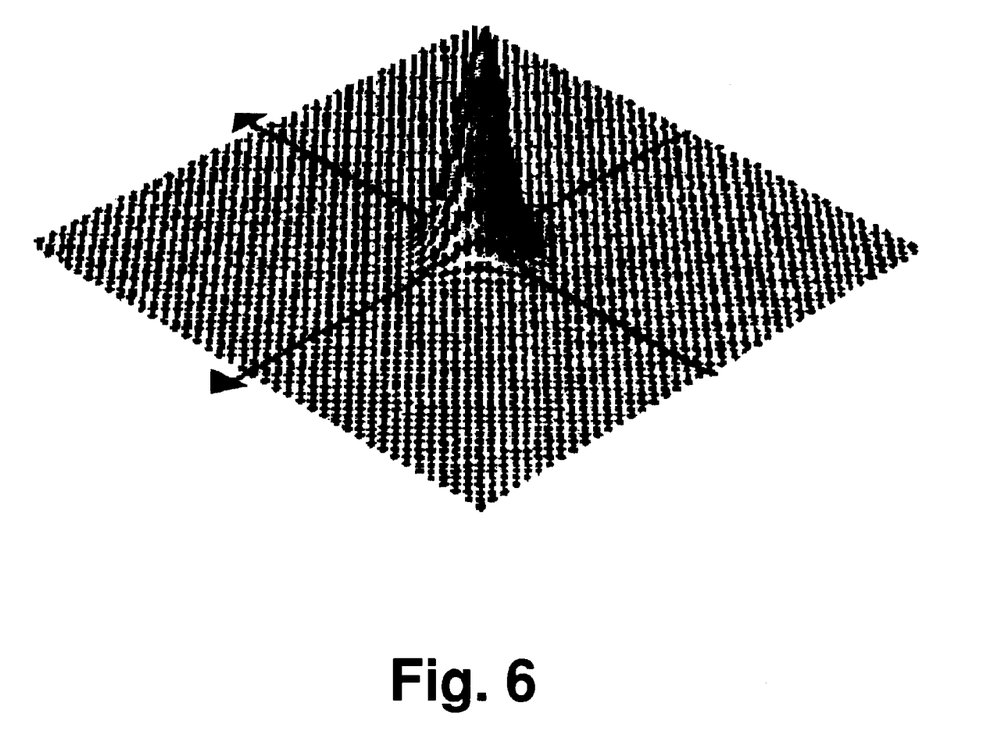
FIG. 6 is a figure explaining the pinhole image of reference mirror and the work surface without slope.

Referring back to FIG. 3, after the optical assembly is switched to coarse adjustment (for autocollimator), the autocollimator image (the pinhole image of the laser light source reflected at the reference mirror 42 and the laser light source reflected at the work end surface) is transferred from the CCD 64 into the personal computer 68 (S202). At the personal computer 68, the brightness of the autocollimator image is analyzed and autocollimation peak diagram such as shown in FIGS. 5 and 6 are created and the peak positions (coordinate) of autocollimator images of the reference mirror 42 and of the work surface are calculated (S203). Although the autocollimator image of the reference mirror 42 is adjusted to always be centered when assembled (and may preferably be annually readjusted using the autocollimator section 62), as shown in FIG. 5, the autocollimator image of the work surface (the end surface which does not have the platen 54 ringinged) generates a peak at a position which is not at center, depending on the slope condition of the work when it is placed on the work placing mount. When the work is not sloped with respect to the mirror surface of the reference mirror 42, on the other hand, both peak positions coincide at the center, and the center becomes high as shown in FIG. 6.

Then it is determined whether or not the peak positions of the autocollimator images of the reference mirror 42 and work surface coincide (S204), and, when they do not, the peak position of the work surface with respect to the peak position of the reference mirror 42, that is, the difference between the two peak positions, (θx, θy) is calculated (S217). The work placing mount is constructed such that it can rotate in both horizontal and vertical directions. Because manipulation point for each support point is predetermined and the shift amount of the peak position with respect to the manipulation amount can be pre-calculated, the manipulation amount in both horizontal and vertical directions can be easily calculated from the difference between two peaks (θx, θy). The work placing mount is then driven by this manipulation amount, correcting the position by (θx, θy) so that the two peaks coincide (S218). In this manner, the autocollimator images of the reference mirror and the work surface are coincided to thereby complete coarse adjustment of auto-leveling.

The process then proceeds to the fine adjustment of autoleveling. First, the optical assembly is switched to the optical assembly for fine adjustment (for interference) as shown on FIG. 4B (S205), and the image of interference fringe of the laser light is input to the personal computer 68 (S206). The image of interference fringe is a repeated pattern of light and darkness. Because the adjustment is still not sufficient after the coarse adjustment process of the work position, the interference fringe may be sloped (right side is higher or the left side is higher in the image), or the number of interference fringes in the field of view may be too many (the pitch of the interference fringe is narrow), or too few (the pitch of the interference fringe is wide). To correct these, the interference fringe patterns are extracted by known image processing from the interference fringe image, and the slope and the pitch of the interference fringe are calculated and stored in memory (S207). This interference fringe process is performed on the interference fringe of the work surface (there are interference fringes of platen surface and of the work surface in the image).

Next, it is determined whether or not the slope and pitch of the calculated and stored interference fringe satisfy a preset condition (horizontal and number of pitches equals 4 to 5) (S208). If they do satisfy this preset condition, the auto-leveling process is completed. If, on the other hand, they do not satisfy the preset condition, the work placing mount is sloped by Δy (S209). As for the pitch of the interference fringe, when there is no relative slope between the reference mirror 42 and the work surface (when they are parallel), because the interference fringe cannot be observed from the observation image captured by CCD 64 because the entire observation surface will have the same brightness as one point of the light and darkness of interference fringe, the interference fringe is generated by slightly sloping the work surface. However, because of the interference fringe characteristics, the same fringe will be observed regardless of the slope direction of the work surface. In other words, if the work surface is set to be long in the length direction, for example, in a case where the work surface is sloped such that the upper part of work surface is higher than the mirror surface of the reference mirror 42 and in a case where the opposite is true, the interference fringes will appear the same if the absolute value of the slopes are the same. By observing whether the number of interference fringes increase of decrease when the work surface is slightly changed, the original slope direction of the work surface can be determined. This also applies to the slope of the interference fringe. Taking these into consideration, in this step, the work is sloped by Δy in the vertical direction to slightly change the interference fringe pitch. After the interference fringes are changed by slight sloping the work, the interference fringe image after this change is captured (S210), and the slope and pitch of the interference fringes after the change are again calculated (S211). Similarly, the work placing mount is sloped by Δx (in horizontal direction) to take the interference fringe image (S212 and S213), and the slope and pitch of the interference fringe after the change are calculated (S214).

By comparing the results from S207 and S211, the slope of the work surface with respect to the mirror surface of the reference mirror 42 in the vertical direction is calculated, and the slope correction Cy in the vertical direction is calculated. By comparing the results from S207 and S214, the slope of the work surface with respect to the mirror surface of the reference mirror 42 in the horizontal direction is calculated, and the slope correction Cx in the horizontal direction is calculated (S215). Based on the correction (Cx, Cy) thus obtained, the personal computer supplies control signals to the driver 86 (in the case of work 1) and fine adjusts the work position. The processes from S206 are then repeated to check if the slope and pitch of the interference fringes satisfy the preset condition, and, if they do, the auto-leveling process is completed.

All of the coarse adjustment processes of S202–S204 and S217–S218, and the fine adjustment process of S206–S216 are automatically executed by a personal computer 68 according to programs, but it is also possible for an operator to perform coarse adjustment process manually and for only fine adjustment to be processed automatically using the personal computer 68.

Figure 7:
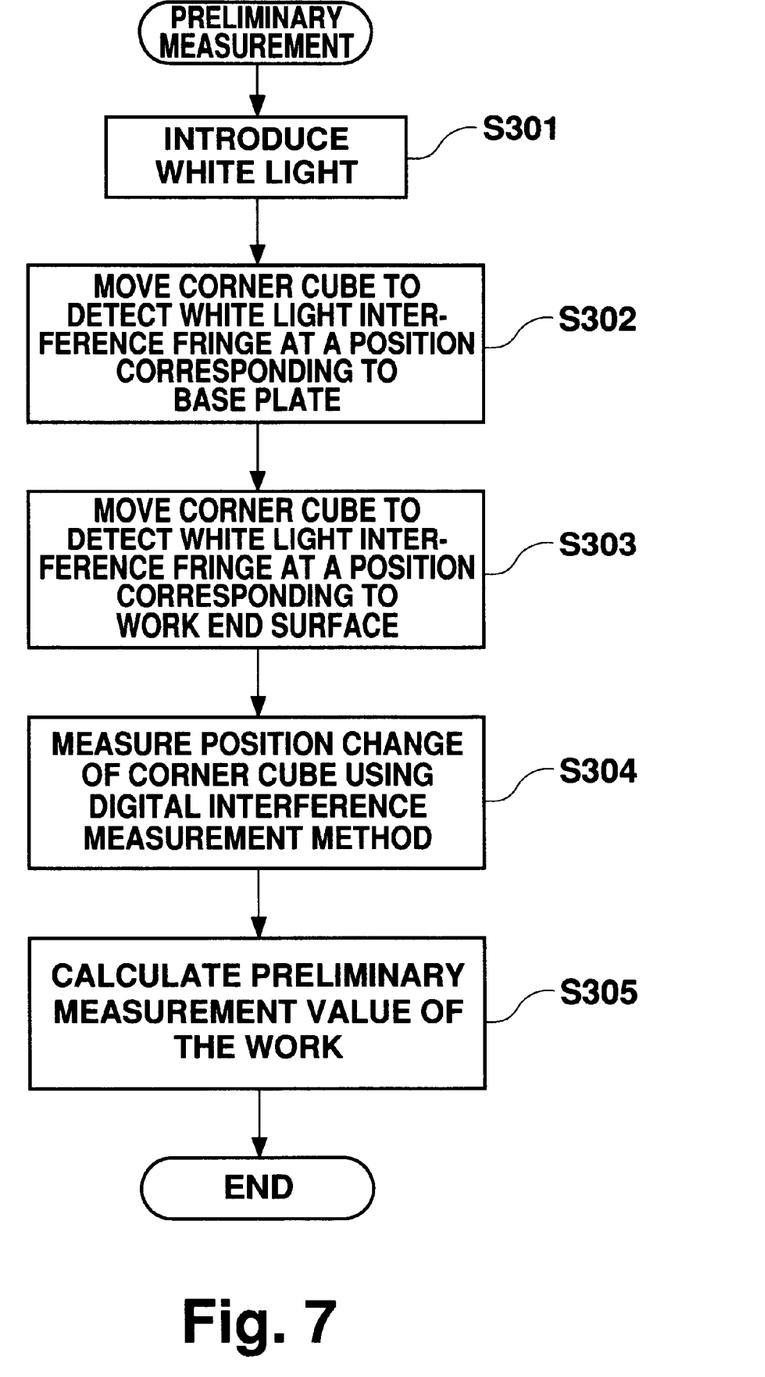
FIG. 7 is a detailed flowchart of the preliminary measurement shown in FIG. 2.

FIG. 7 shows detailed flowchart of the preliminary measurement process performed after the auto-leveling process shown as S103 in FIG. 2. First, the shutter 25 is closed and the shutter 29 is opened to introduce white light onto interference booth 100, and, at the same time, the light path switching mirror 40 is set at position B to introduce reflected light from beam splitter 38 into corner cube CC1 (S301). The corner cube moving mount 48 is then moved to a position near position D shown on FIG. 1, and the white light interference fringe at a position corresponding to the platen 54 is detected (S302). The corner cube moving mount 48 is moved to a position near position D in order to coincide the optical distance from the beam splitter 38 to the reference mirror 50 with the optical distance from the beam splitter 38 to the platen 54. When these two optical distances coincide, white light interference fringes of platen 54 are generated. The signal of the white light interference fringe is detected from the interference fringe image, and the corner cube moving mount 48 is set at a position where the interference fringe becomes darkest (in this example, for purpose of explanation, it is assumed that this occurs at position D).

The corner cube moving mount 48 is then moved to a position near position C shown on FIG. 1 and the white light interference fringe at a position corresponding to the work end surface (the surface where the platen 54 is not ringinged) is detected (S303). The corner cube moving mount 48 is moved to a position near position C in order to coincide the optical distance from the beam splitter 38 to the reference mirror 50 with the optical distance from the beam splitter 38 to the work end surface, and white light interference fringe of the work end surface is generated when these two distances coincide. The signal of white light interference fringe is detected from the interference fringe image, and the corner cube moving mount 48 is set at a position where the interference fringe is darkest (for purpose of explanation, assume this occurs at position C).

When the position corresponding to the platen 54 (position D) and the position corresponding to the work end surface (position C) are determined, the distance between C and D, the distance moved by the corner cube moving mount 48, is measured using the interference fringe counting method (S304). Specifically, the interference light of the laser light reflected by another corner cube CC2 provided on the corner cube moving mount 48 and the laser light reflected by the corner cube CC is received at a light receiving element 53, and the distance between C and D is measured based on the phase difference. Because the work dimension is equal to twice the distance moved by the corner cube moving mount 48 (distance between C and D), the preliminary measurement dimension of the work can be calculated by doubling the detected distance between C and D (S305). Because, unlike laser light, the range of wavelengths included in white light is large, unlike the laser light, the interference fringe only occurs when the distance from the beam splitter 38 to the reference mirror 50 is almost equal (within 1 $\mu$m difference) to the distance between the beam splitter 38 and the measurement surface (platen 53 or work end surface), and preliminary measurement of high precision can be performed.

Figure 8:
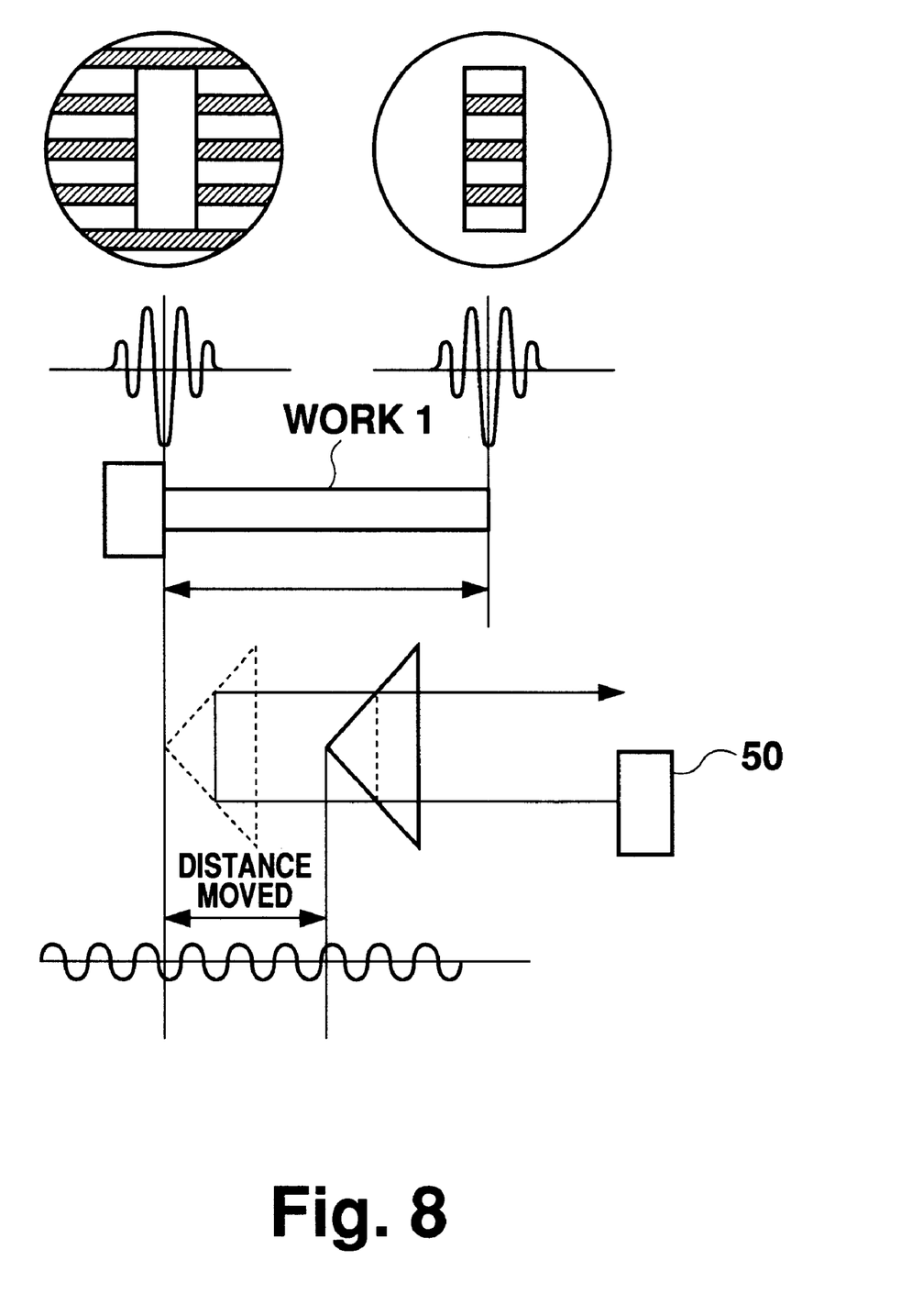
FIG. 8 is a model figure showing the process shown in FIG. 7.

FIG. 8 shows a model figure explaining the preliminary measurement described above. FIG. 8 shows, from top to bottom, respective white light interference fringes of platen 54 and work end surface, detecting signals, the positions (position D and C) of the corner cube moving mount 48 for generating respective interference fringes of the base plate 54 and the work end surface, and the detecting signals in the interference fringe counting method. The moved distance CD of the corner cube equals to L/2, where L is the dimension of work and the distance from base plate 54 to the end surface.

Figure 9:
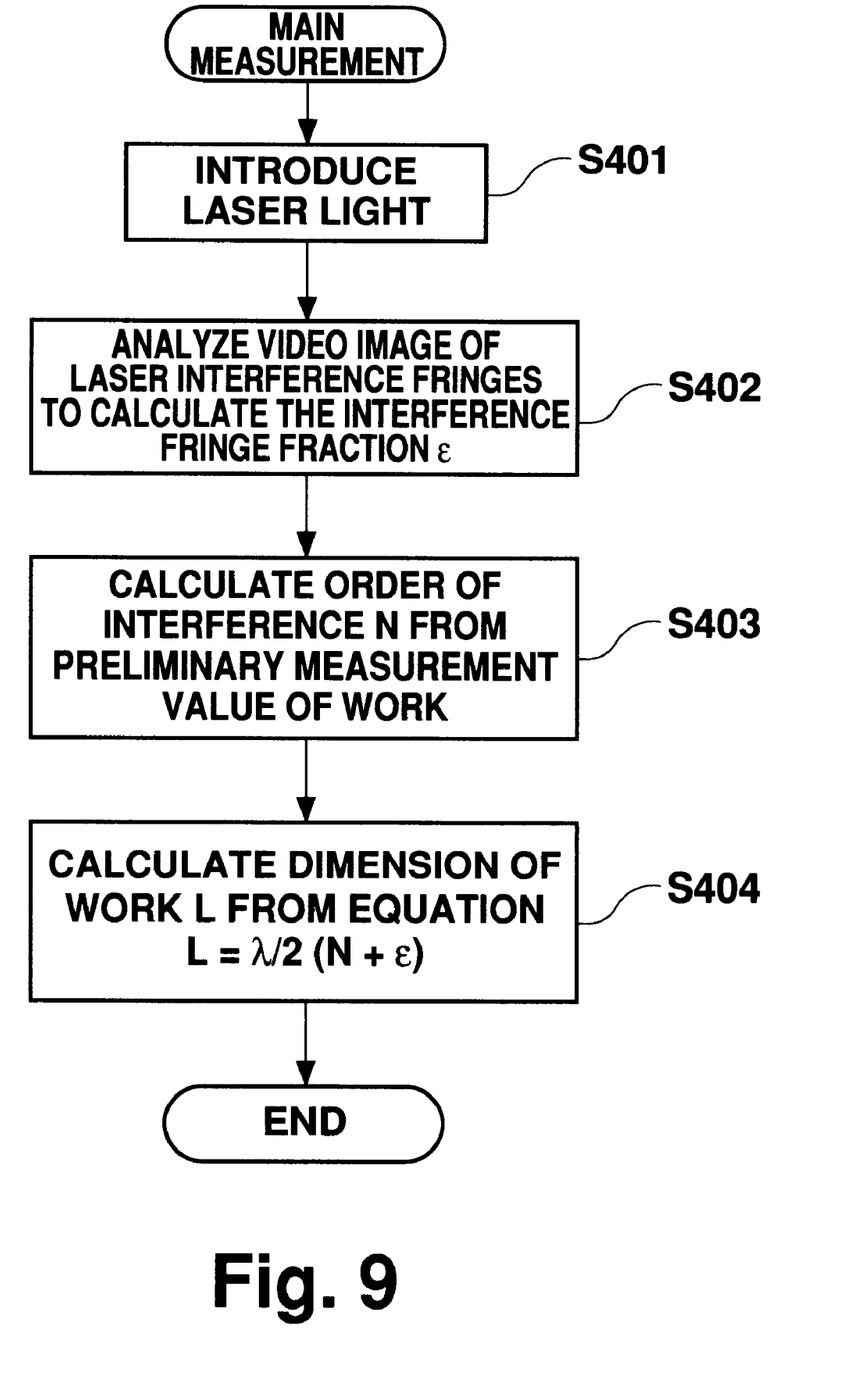
FIG. 9 is a detailed flowchart of the main measurement process shown in FIG. 2.

FIG. 9 shows a detailed flowchart of step S104 shown on FIG. 2, which is the main measurement process after the preliminary measurement is completed. First, the shutter 25 is opened and the shutter 29 is closed to introduce laser light into the interferometer booth 100, and at the same time, the light path switching mirror 40 is set at position A to introduce laser light onto the work and the reference mirror 42 (S401). Then , the laser light interference fringes generated with the reference mirror 42 as a reference is taken into the personal computer 68 and the image is analyzed to calculate interference fringe fraction E (S402). The interference fringe fraction $\epsilon$ is calculated based on the difference between the interference fringes generated at the base plate 54 region and the interference fringes generated at the work end surface region in the interference fringe image obtained by CCD 64. More specifically, the fraction $\epsilon$ equals to the ratio b/a, where a is the pitch of the interference fringes generated at the base plate 54 region and b is the phase difference between the interference fringes of each of the two regions.

The integer of interference fringe N is then calculated from the preliminary measurement value of the work (S403). The order of interference can be calculated using, for example, equation (2) described in Japanese Patent Laid-Open Publication No. Hei 10-203130. After the integer of interference fringe N and the interference fringe fraction $\epsilon$ are calculated, the dimension of work, L, is calculated using the relation L=$\lambda$/2 (N+$\epsilon$) (S404).

As described, in the present embodiment, laser light and white light are successively introduced to the same interferometer booth 100 and the position adjustment of the work using the laser light, the preliminary measurement of the work using white light, and the main measurement of the work using laser light are successively performed in the same interferometer booth 100. Because of this, it is only necessary to performed the placing of works and set steps, such as temperature equalization, once (conventionally, work are placed and measured for preliminary measurement, and later the placement and measurement of work are performed again for the main measurement), thus resulting in quick measurement of the dimension of the work.

Moreover, because the preliminary and main measurements can be performed using the same interferometer booth 100, differences in ambient environment such as temperature difference for the preliminary and main measurement do not occur, and therefore the reliability and precision of the preliminary measurement can be improved, and it is possible to perform laser interference measurement using a single wavelength.

Figure 10:
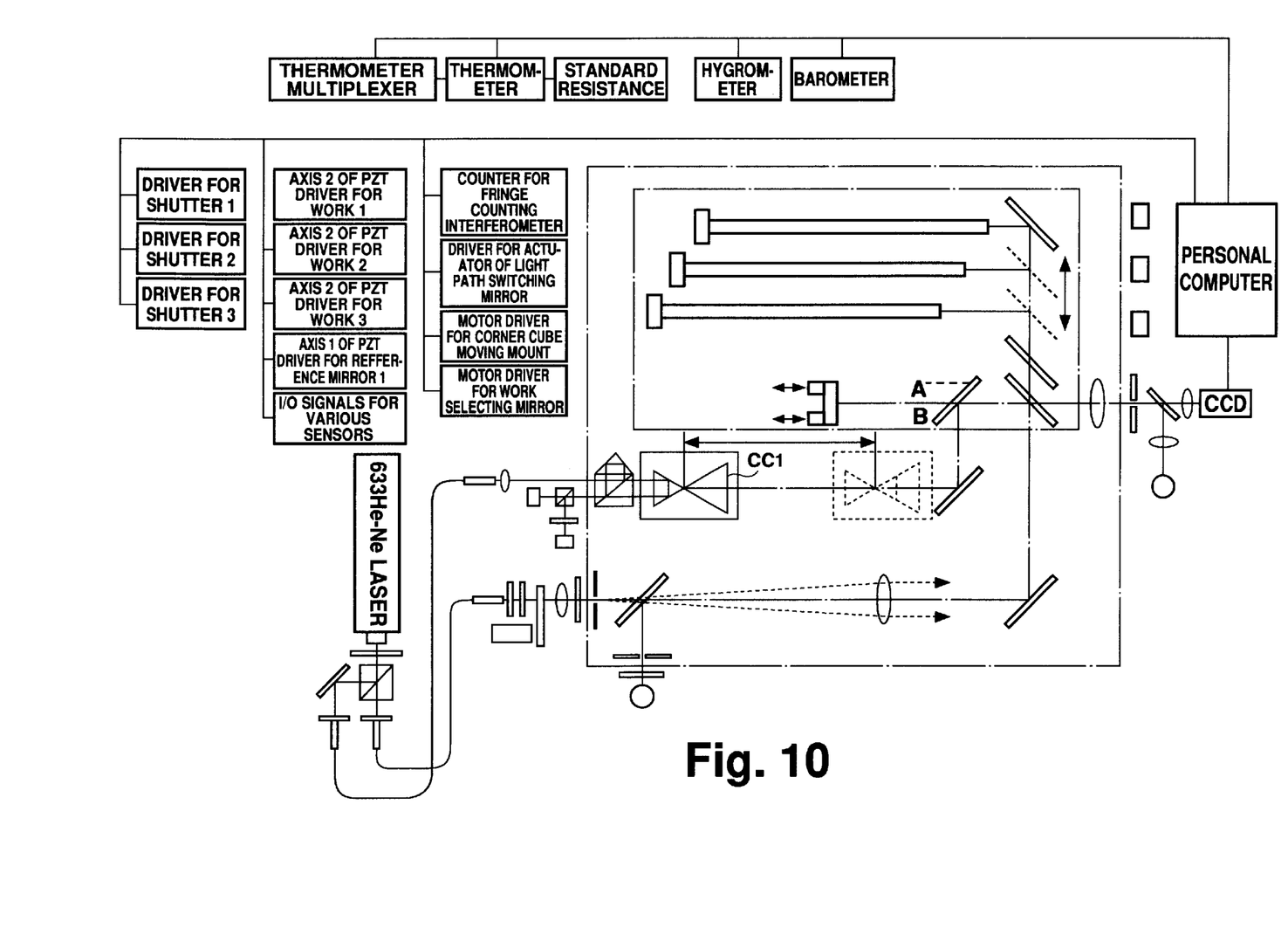
FIG. 10 is a structural block diagram of another embodiment of the present invention.

FIG. 10 is a structural block diagram showing an interferometer according to another embodiment of the present invention. The structure shown in this figure differs from that of FIG. 1 in that the reference mirror 50 (reference mirror (2)) does not exist and the corner cube CC1 also acts as the reference mirror.

When a reference mirror 50, acting as second reference surface, is constructed as a plane mirror as in the case shown on FIG. 1, a large corner cube CC1 must be employed to correspond to the size of interference luminous flux. By using the corner cube CC1 itself as a reference mirror instead of plane mirror as in the previous embodiment, the size of the corner cube can be reduced and there are also advantages on positional change involved with the movement during preliminary measurement.

Other structures and the measurement method are the same as the embodiment described above, and their description will not be repeated in detail here.

Figure 11:
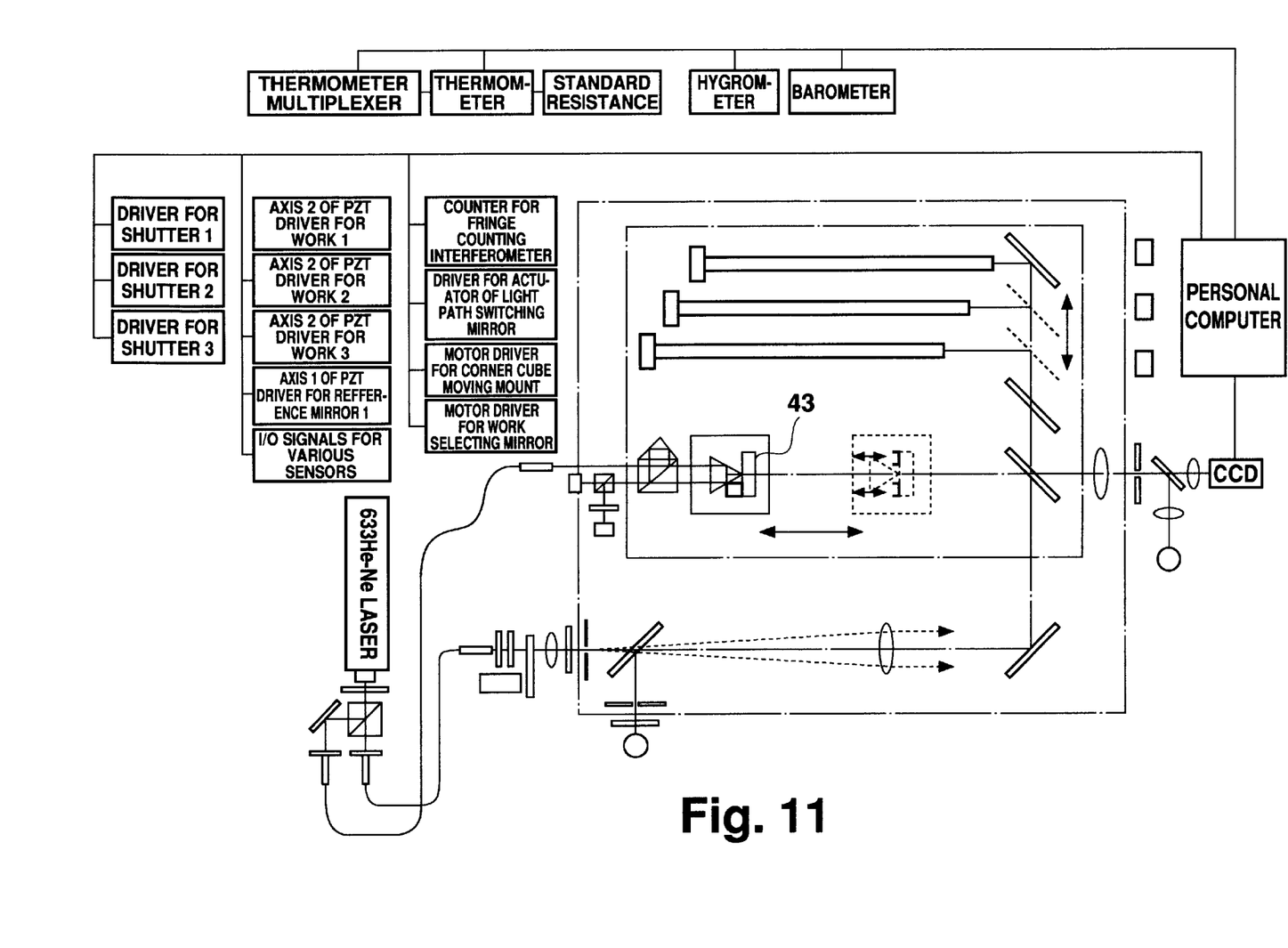
FIG. 11 is a structural block diagram of a further embodiment of the present invention.

FIG. 11 is a structural block diagram of an interferometer according to a still further embodiment of the present invention. This structure differs from that of FIG. 1 in that the reference mirror 42 acting as the first reference surface, and the reference mirror 50 acting as the second reference surface are constructed as the same reference mirror 43. As a result, the light path switching mirror 40, mirror 46, and corner cube CC1 required in FIG. 1 are not required. As can be seen from the description of the first embodiment, laser light and the white light are never used simultaneously, and a portion of the light path of the laser light and of the light path of the white light is shared. Therefore, it is possible to use one mirror for both the reference mirror 42, acting as the first reference surface, and the reference mirror 50, acting as the second reference surface. By doing so, the structure can be further simplified compared to the structures shown on FIG. 1 or FIG. 10. The preliminary measurement is performed by moving the reference mirror 43 in the direction of arrow shown on the figure.

Figure 12:
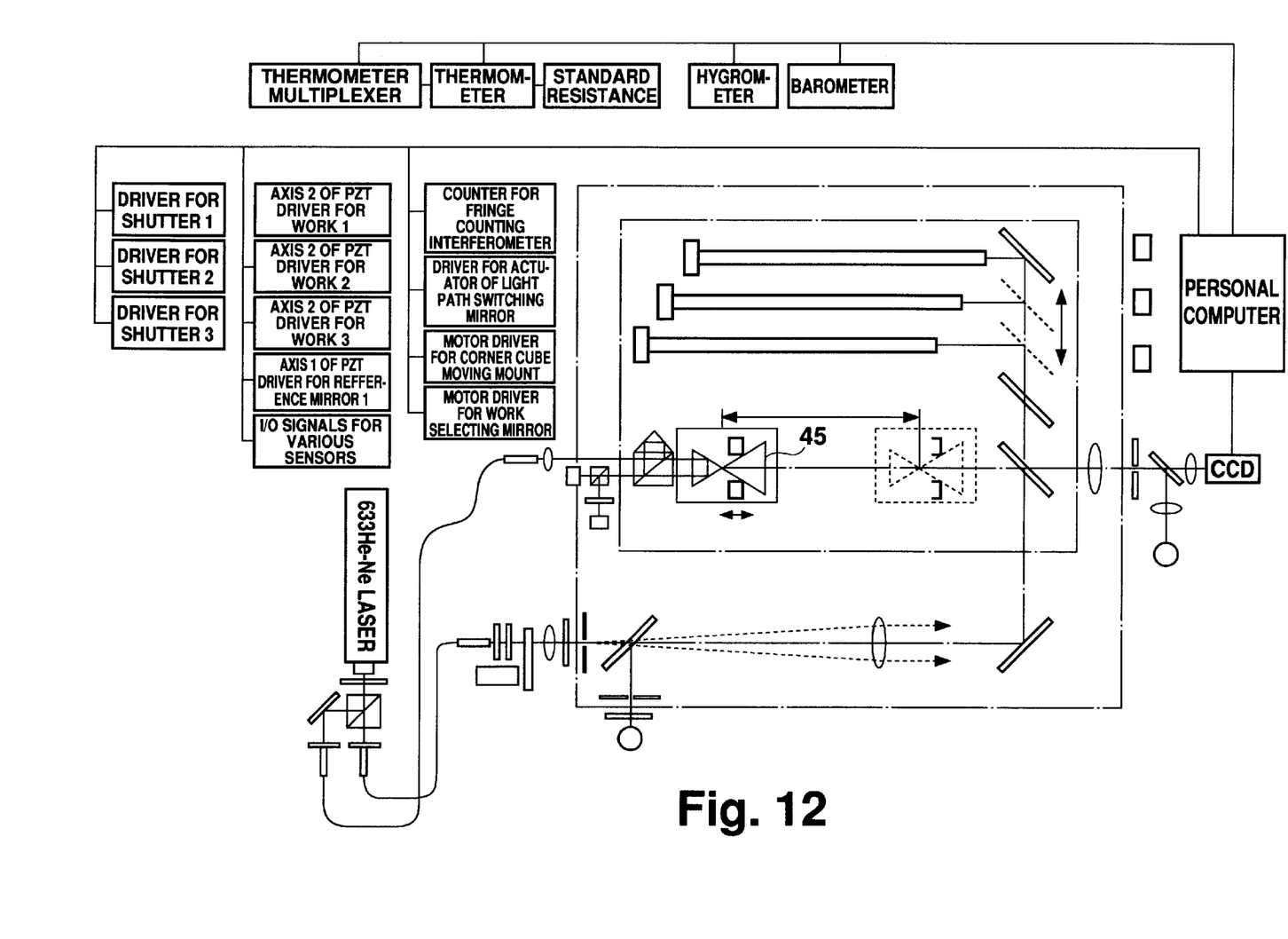
FIG. 12 is a structural block diagram of yet another embodiment of the present invention.

FIG. 12 shows a structural block diagram of an interferometer according to yet another embodiment of the present invention. This structure in turn differs from that of FIG. 11 in that the reference mirror 43, acting as the first and second reference mirror, is constructed from the corner cube 45. Therefore, the structure can be further simplified compared to the structures shown in FIGS. 1 or 10, and there is an additional advantage in the positional change involved with the movement compared to the structure shown on FIG. 11, which employs a plane mirror.

As described above, both preliminary and main measurements can be successively performed within the same interferometer, and the work (end standard) can be measured quickly and with high precision.

What is claimed is:

1. An interferometer for measuring dimension of a work using laser light interference comprising;

a laser light source, a white light source, a first optical assembly for introducing laser light from said laser light source onto a work and onto a first reference surface which acts as reference for laser light interference, a second optical assembly for introducing white light from said white light source onto a work and onto a second reference surface which acts as reference for white light interference, a work adjustment means for adjusting the slope of the work with respect to said first reference surface, an interference fringe detecting means for detecting laser light interference fringe generated by said first optical assembly and white light interference fringe generated by said second optical assembly, and a control means for controlling said first optical assembly, second optical assembly, work adjustment means, and interference fringe detecting means to successively perform a position adjustment of the work using laser light interference, preliminary measurement of the work using white light interference, and main measurement of the work using laser light.

2. An interferometer according to claim 1, wherein said first optical assembly includes a first beam splitter for splitting the laser light from said laser light source into laser light incident on said work and laser light incident on said first reference surface, and said second optical assembly includes a second beam splitter for splitting the white light from said white light source into white light incident on said work and white light incident on said second reference surface.

3. An interferometer according to claim 2, wherein said first beam splitter and second beam splitter are the same beam splitter.

4. An interferometer according to claim 3, further comprising a means for introducing laser light radiated from said beam splitter onto said first reference surface and for introducing white light radiated from said beam splitter onto said second reference surface.

5. An interferometer according to claim 2, wherein a first shutter is provided for turning laser light on and off on the light path between said laser light source and said first beam splitter in said first optical assembly, a second shutter is provided for turning white light on and off on the light path between said white light source and said second beam splitter in said second optical assembly, and said control means introduces laser light by controlling said first shutter to open and said second shutter to close during said step of position adjustment of work and step of main measurement, and introduces white light by controlling said first shutter to close and said second shutter to open during said step of preliminary measurement.

6. An interferometer according to claim 2, further comprising a moving means for changing optical distance from said second beam splitter to said second reference surface, and a means for detecting the change in distance.

7. An interferometer according to claim 1, wherein said second reference surface is a plane mirror.

8. An interferometer according to claim 1, wherein said second reference surface is a corner cube shaped reflection plane.

9. An interferometer according to claim 1, wherein said first and second reference surfaces are the same.

10. A method of measuring a work using an interferometer comprising:

placing said work within an interferometer, introducing laser light into the interferometer and adjusting the position of the work with respect to a reference surface using laser light interference, introducing white light into the interferometer and performing a preliminary measurement of the work using white light interference, and introducing laser light into said interferometer and performing a main measurement of said work using laser light interference, wherein the position adjustment, preliminary measurement, and main measurement are performed successively in the same interferometer.

11. A method according to claim 10, wherein adjusting the position of the work comprises the steps of, a coarse adjustment for adjusting the positional difference between the pinhole image of said reference surface and the pinhole image of the work, and a fine adjustment for adjusting the interference fringe of the work surface generated by interference of said laser light to a preset value.

* * * * *